United States Patent
Trim et al.

(10) Patent No.: US 11,576,078 B2
(45) Date of Patent: Feb. 7, 2023

(54) SELECTIVE COMPRESSION OF DATA FOR UPLINK TO A TELECOMMUNICATION NETWORK

(71) Applicant: International Business Machines Corporation, Armonk, NY (US)

(72) Inventors: Craig M. Trim, Ventura, CA (US); Faried Abrahams, Laytonsville, MD (US); Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/201,814

(22) Filed: Mar. 15, 2021

(65) Prior Publication Data

US 2022/0295345 A1 Sep. 15, 2022

(51) Int. Cl.
*H04W 28/06* (2009.01)
*H04W 80/02* (2009.01)
(Continued)

(52) U.S. Cl.
CPC ............ *H04W 28/06* (2013.01); *H04L 69/04* (2013.01); *H04L 69/22* (2013.01); *H04W 80/02* (2013.01)

(58) Field of Classification Search
None
See application file for complete search history.

(56) References Cited

U.S. PATENT DOCUMENTS 10,057,777 B2  8/2018  Li
10,524,166 B2  12/2019  Youn
(Continued)

FOREIGN PATENT DOCUMENTS

EP    2829127 B1    9/2016

OTHER PUBLICATIONS

"LTE eNB Architecture", LTE Tutorials, Artiza Networks, ©2001-2021 Artiza Networks, Inc., 3 pps., <http://www.artizanetworks.com/resources/tutorials/arc.html>.

(Continued)

*Primary Examiner* — Duc T Duong
(74) *Attorney, Agent, or Firm* — Stephanie L. Carusillo

(57) ABSTRACT

A computer-implemented method for selectively excluding data from compression prior to uplink to a telecommunication system. In an embodiment, the method analyzing a request by an application, executing within a device, to wirelessly uplink data to a telecommunication node. The method further includes establishing a set of logical channels assigned to the application. The method further includes transferring the data among one or more logical channels, of the set of logical channels, based on a status flag related to data compression corresponding to the data. The method further includes determining that the data is transferred via a compression-disabled logical channel, of the set of logical channels. The method further includes responding to determining that the data is transferred via the compression-disabled logical channel by bypassing a data compression function prior to preparing the data for uplink. The method further includes uplinking the data to the telecommunication node.

20 Claims, 4 Drawing Sheets

(51) Int. Cl.
    *H04W 72/02*  (2009.01)
    *H04L 29/08*  (2006.01)
    *H04L 69/22*  (2022.01)
    *H04L 69/04*  (2022.01)

(56) References Cited

U.S. PATENT DOCUMENTS

| | | | |
|---|---|---|---|
| 10,616,383 B2 * | 4/2020 | Mobasher | H04L 1/0086 |
| 10,638,353 B2 | 4/2020 | Ahmadzadeh | |
| 2013/0210371 A1 * | 8/2013 | Hashimoto | H04W 24/06 455/67.14 |
| 2017/0078916 A1 | 3/2017 | Wang | |
| 2018/0227096 A1 * | 8/2018 | Lim | H04W 72/082 |
| 2019/0200257 A1 * | 6/2019 | Yang | H04L 1/16 |
| 2019/0238661 A1 | 8/2019 | Raina | |
| 2019/0364541 A1 | 11/2019 | Ryu | |
| 2020/0344629 A1 * | 10/2020 | Kim | H04W 52/0209 |
| 2021/0127294 A1 * | 4/2021 | Kwak | H04W 28/0205 |
| 2021/0185560 A1 * | 6/2021 | Shreevastav | H04L 47/34 |
| 2021/0219175 A1 * | 7/2021 | Xu | H04L 12/40169 |
| 2022/0038945 A1 * | 2/2022 | Dalmiya | H04L 5/1469 |
| 2022/0095161 A1 * | 3/2022 | Kim | H04W 12/033 |

OTHER PUBLICATIONS

"Optimizing Network Applications for 5G", Ericsson, News, Apr. 21, 2017, 3 pps., <https://www.ericsson.com/en/news/2017/4/optimizing-network-applications-for-5g>.

Aijaz, "Packet Duplication in Dual Connectivity Enabled 5G Wireless Networks: Overview and Challenges", IEEE Communications Standards Magazine, 9 pps., May 29, 2019, <https://arxiv.org/pdf/1804.01058.pdf>.

Collela, "5G and IoT: Ushering in a new era", Ericsson, © Telefonaktiebolaget LM Ericsson 1994-2021,2 pps., <https://www.ericsson.com/en/about-us/company-facts/ericsson-worldwide/india/authored-articles/5g-and-iot-ushering-in-a-new-era>.

Jung, "Optimizing media and radio signal processing for 5G", Mar. 20, 2018, 3GPP A Global Initiative, 5G, 2 pps., <https://www.3gpp.org/news-events/1950-sa4>.

Maximov et al., "Uplink Data Compression 3GPP Solutions for Enhancing the Uplink Performance", Mediatek, White Paper, Copyright 2018 © MediaTek, Inc., 21 pps., <https://d86o2zu8ugzlg.cloudfront.net/mediatek-craft/documents/MediaTek-UDC-White-Paper-PDFUDCWP-0718.pdf>.

Mishra, "Advanced Cellular Network Planning and Optimisation 2G/2.5G/3G . . . Evolution To 4G", Copyright 2007 John Wiley & Sons, Ltd., 544 pps., <https://www.pdfdrive.com/advanced-cellular-network-planning-and-optimisation-2g25g3gevolution-to-4g-d158435474.html>.

"5G/NR-PDCP", 5G—Frame Structure—5G, ShareTechnote, downloaded from the Internet on Mar. 15, 2021, <http://www.sharetechnote.com/html/5G_PDCP.html>.

* cited by examiner

SELECTIVE COMPRESSION OF DATA FOR UPLINK TO A TELECOMMUNICATION NETWORK

BACKGROUND OF THE INVENTION

The present invention relates generally to the field of transmitting data to a telecommunication system, and in particular to managing compression of data to uplink to a next generation telecommunication node.

Mobile telecommunication systems were initially developed to provide a voice service while guaranteeing activity of a user. Mobile telecommunication systems have evolved to provide text and data services in addition to voice services. Increases in the number and demands of users of advanced mobile devices has generated a dramatic increase of traffic and higher-speed/bandwidth service requirements. For example, telecommunication advances have been key enablers for many technologies including video streaming and artificial intelligence (AI) to succeed by reducing or eliminating various limiting factors, such as sedentary operations, lower bandwidth communications, etc. Advances associated with fifth generation (5G) telecommunication technologies are expected to serve as enablers to push dependent technologies to higher level performance and capabilities through mobile bandwidths of 1 GBPS (gigabits/second) or greater, convergence of Internet-of-things (IoT) device access, etc.

5G new radio (NR) is a radio access technology designed as the wireless air interface of 5G networks. In 5G NR the medium access control (MAC) layer provides services to the radio link control (RLC) layer. One service of the MAC layer service provides logical channels to the RLC layer, which further enables the creation of multiple logical channels over a single radio bearer network using 5G network slicing models. Some logical channels carry control information and other logical channel convey data traffic from the 5G-enabled user equipment (UE) to a 5G network node (i.e., a base station). In addition, the 5G-enabled network node can utilize logical channels linked to the UE to process packets corresponding to different data at differing "quality of service" (QoS) among designated logical channels.

SUMMARY

According to an aspect of the present invention, there is a computer-implemented method, computer program product, and/or system for selectively compressing data to uplink to a telecommunication system. In an embodiment the method includes at least one computer processor analyzing a request by an application, executing within a device, to wirelessly uplink data to a telecommunication node. The method further includes at least one computer processor establishing a set of logical channels assigned to the application. The method further includes at least one computer processor transferring the data among one or more logical channels, of the set of logical channels, based on a status flag related to data compression corresponding to the data. The method further includes at least one computer processor set of logical channels. The method further includes at least one computer processor responding to determining that the data is transferred via the compression-disabled logical channel by bypassing a data compression function prior to preparing the data for uplink. The method further includes at least one computer processor uplinking the data to the telecommunication node.

DETAILED DESCRIPTION

Figure 1:
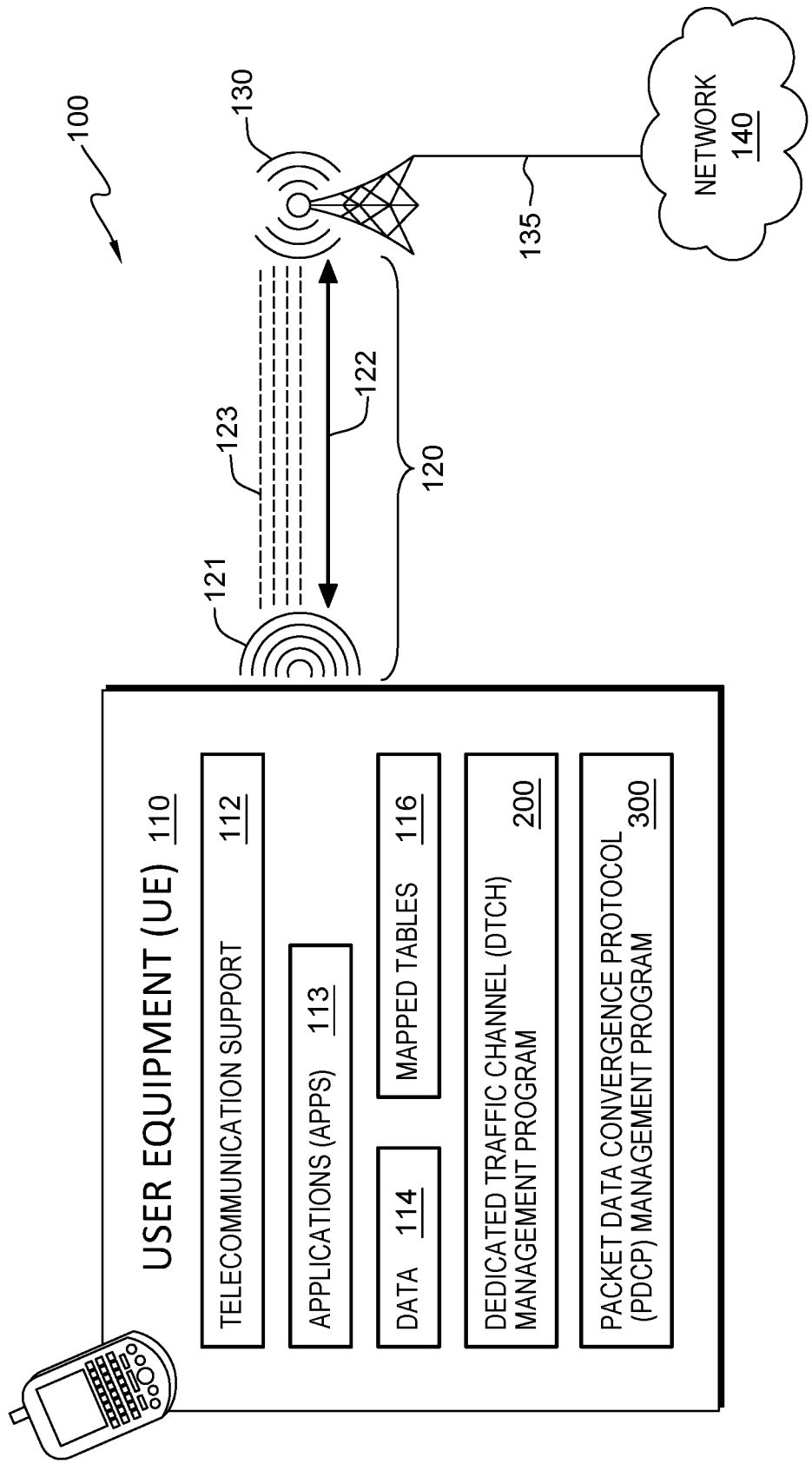
FIG. 1 illustrates a wireless telecommunication communication environment, in accordance with an embodiment of the present invention.

Embodiments of the present invention recognize that one feature of fifth-generation new radio telecommunication technology (5G NR) is the automatic compression of data within 5G-enabled user equipment (UE), such as smartphone, tablet computers, and other wireless devices prior to transmission. Embodiments of the present invention recognize that 5G NR technology enables the packet data convergence protocol (PDCP) within 5G NR-enabled UEs to capture and compress data (i.e., payload) packets from upper layer protocols in the UE stack and also compress the uplink packets prior to transmission over the radio (e.g., wireless) interface. However, embodiments of the present invention recognize that the payload compression mechanism included within the PDCP sub-layer of a 5G-enabled UE collects the upcoming packets for transmission and performs data (payload) compression on each data packet coming from upper layer of the 5G system stack without considering the effects to both the UE and the user utilizing the UE, such as increased power consumption and slower response time.

Embodiments of the present invention also recognize that within 5G telecom network, the medium access control (MAC) sub-layer of 5G NR provides services to the Radio Link Control (RLC) sub-layer controls are provided in the form of logical channels. Embodiments of the present invention recognize that the logical channels are virtualized communication network interfaces that are used to transfer IO commands (e.g., network data packets) and control instructions over radio interface of a 5G fixed access network. A logical channel is defined by the type of information it carries and is generally differentiated as a control channel, used for transmission of control and configuration information; or a traffic channel used to communicate data. Embodiments of the present invention also recognize that 5G NR technology allows for the creation of multiple logical channels over a single radio bearer network using the 5G network slicing models. The multiple logical channels are used to carry a specialized traffic from 5G NR-enable UE device to an evolved node B (eNodeB) of the 5G network. As multiple logical channels are created from a single device to the 5G eNodeB, the multiple logical channels deliver parallelism in the packet transmission as well as reducing the exclusive locking of the 5G network resources that gives performance benefits.

In addition, embodiments of the present invention recognize that another feature of 5G NR technology enables individual software applications to create dedicated logical channels to transmit data over NR interface from the application layer to a 5G eNodeB. In such an implementation, the dedicated traffic channels of an application transmit packets to PDCP sub-layer and subsequent lower protocols transfer the data to a destination (e.g., UEs or an eNodeB) over Radio. Once the data is submitted to PDCP sub-layer, the PDCP sub-layer performs data alignment and convergence of data packets prior to forwarding the prepared data packets to RLC controls.

However, embodiments of the present invention further recognize that the 5G NR stack dictates that all the data packets are compressed before data convergence at PDCP, which is a highly CPU intensive activity and consumes a lot of processor power. Further, the dictated compression of data adds additional latency to the packet data transmission over Radio Bearer until reaching the serving gateway (SGW). Further, today 5G NR technology does not include a mechanism for selective data payload compression at PDCP that saves the computing resources and reduces the power consumption of the UE. There is no communication between an application, service data adaptation protocol (SDAP) sub-layer, and PDCP sub-layer regarding compressibility information related to upcoming data for uplink traffic, which lead to further inefficiency in the 5G RAN.

Embodiments of the present invention utilize the 5G UE User Plane (UP) stack, the SDAP sub-layer, DTCH controller, and the PDCP sub-layer of the 5G UP protocol to enable selective compression of uplinked packet payloads while still executing instances of robust header compression (RoHC) protocol for header information, and PDCP ciphering for data from designated applications. Some embodiment of the present invention can exclude (i.e., bypass) low compression ratio data packets from the PDCP payload compression function by DTCH identification and selectively compressing the data payload from certain DTCH logical channels that sends compression efficient packets to a lower layer. Thus, embodiments of the present invention save the computation bandwidth at a UE, improves CPU and memory resource utilization, and reduces the overall power consumption of the UE as PDCP child instances are instructed for selective compression.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating wireless telecommunication communication environment 100, in accordance with embodiments of the present invention. In an embodiment, wireless telecommunication communication environment 100 includes, user equipment (UE) 110 and telecommunication node 130 interconnected via wireless communications 120. In addition, wireless telecommunication communication environment 100 includes network 140 interconnect to telecommunication node via network link 135.

User equipment (UE) 110 may be a laptop computer, a tablet computer, a netbook computer, a personal computer, a desktop computer, a personal digital assistants (PDA), a smart phone, a wearable device (e.g., smart glasses, a smart watch, an e-textile, an AR headsets), a wireless router, a medical device, a fitness device, an entertainment console or any programmable computer system known in the art. In certain embodiments, UE 110 represents a computer system utilizing clustered computers and components (e.g., database server computers, application server computers, storage area networks) that act as a single pool of seamless resources, as is common in data centers and with cloud-computing applications.

In general, UE 110 is representative of any programmable electronic device or combination of programmable electronic devices capable of executing machine readable program instructions and wirelessly communicating with telecommunication node 130. System 110 may include components, as depicted and described in further detail with respect to FIG. 4, in accordance with embodiments of the present invention.

UE 110 includes telecommunication support 112, applications (apps) 113, data 114, mapped tables 116, dedicated traffic channel (DTCH) management program 200, packet data convergence protocol (PDCP), management program 300, and other programs and data (not shown). In addition, UE 110 can establish wireless communications 120 with telecommunication node 130. Examples of other programs and data include an operating system (OS), a camera program, a media player, a contact list, communication programs, etc. In some embodiments, UE 110 includes additional hardware and features (not shown), such as one or more cameras, a speaker, a microphone, a compass, an inertial monitoring system, a global positioning system (GPS), and/or other features associated with a mobile device.

Telecommunication support 112 includes hardware, software, and firmware features (not shown) that can generate wireless signal 121 to establish wireless communications 120 with telecommunications node 130 utilizing 5G NR technology. In addition, telecommunication support 112 also includes hardware, software, and firmware features (not shown) that provide support for 5G NR technology, such as a DTCH controller, a ciphering module, various sub-layers and services (discussed above), and other features and services known in the art. In some embodiments, telecommunications support 112 also includes one or more peripherals or adapters that support 5G NR wireless technology operatively coupled to an instance of UE 110 that originally lacked wireless communication capabilities or lacked support for 5G NR technology.

Applications (Apps) 113 represent a plurality of apps (e.g., mobile device applications) installed within UE 110. For example, apps 113 may include an e-mail app, a productivity suite (e.g., a word processor, a spreadsheet, a presentation program, etc.), one or more social media apps, a camera app, a dictation app, etc. In some embodiments, an app of apps 113 can output data in more than one format, resolution, and/or degree of compression. In a further embodiment, an app of apps 113 represents an application program interface (API) or other program executing external to UE 110, such as a web app that request to uplink data from data 114.

In an embodiment, one or more apps of apps 113 generate and/or output data that is uplinked (i.e., transmitted) to a 5G network via telecommunication node 130. In one scenario, a first app of apps 113 generates data in-situ, such as a text message, or a live stream video and creates a request to uplink the data to a 5G network. In another scenario, second app of apps 113 generates data, such as picture taken by a camera app and stored within a photo gallery, audio recoded via a dictation app, a document generated by a word processing app that is stored within data 114. Subsequently, a user or another app utilizes a third app creates a request to uplink the data to a 5G network. In one example, a user creates a social media post the includes a photo stored within data 114. In another example, a calendar app can initiate an e-mail to a group of users that includes a document, such as a renewal notice stored within data 114.

Data 114 is representative of a plurality of data that a user or application can be uplinked to telecommunication node 130. Data 114 may include a gallery of pictures, documents, screen captures, a contact list, previously downloaded information, web links, media files, etc. In some embodiments, data 114 also includes metadata related to one or more items stored within data 114, such as an app that generated the data; information indicating whether a potentially compressible data format was pre-compressed by the app that generated the data; information related to the content included within an item of data, such as one presentation including a high percentage of text as opposed to a second presentation including a high percentage multi-media content and animated elements.

Mapped tables 116 includes a set tables, lists, and/or associative arrays utilized to interrelate various source of information associated with 5G NR uplinks of data. In an embodiment, one or more tables of mapped tables 116 interrelate an application (app) ID, a data type, a compression status flag (e.g., apply the PDCP payload data compression function, excluded data compression by the PDCP payload data compression function), logical channel IDs and DTCH IDs. In one embodiment, DTCH program 200 creates or updates one or more tables or a group of fields within mapped tables 116. For example, each DTCH_CREATE, DTCH_MODIFY, and DTCH_DISCONNECT operation triggers an update to mapped tables 116 to maintain consistency among functions and services. Subsequently, PDCP program 300 utilize mapped tables 116 to selectively control whether compression is applied to data or data packets prior to uplink to telecommunication node 130.

In some embodiments, mapped tables 116 also includes a table or a list of data types and/or file formats that further includes indications or flags that signify that a data type/file format is uncompressed (e.g., is compressible), is compressed (e.g., is not compressible), or is potentially compressible. For example, with respect to image files, bmp format is uncompressed, tiff format is compressed, and jpeg format maybe be compressible. In addition, some file formats that are highly compressible and other formats can be compressed to a limited degree. For example, encryption makes a file appear more random, so compression is less effective/efficient. In another embodiment, mapped tables 116 further includes another table or another list that associates a compression ratio value or other metric associated with a data type/file format and/or app as determined during prior executions of PDCP management program 300. In a further embodiment, mapped tables 116 includes another flag associated with data compression that indicates that the data (e.g., a plurality of data packets) for uplink includes both data packets that are compressible and data packets excluded from compression.

DTCH management program 200 that analyzes a request to uplink data by an app to determine whether the data is processed by one or more logical channels designate to transfer data subject to data compression (i.e., compression-enabled channels) or one or more logical channels designated to transfer data excluded from compression (i.e., compression-disabled channels) prior to uplink the data to a 5G NR telecommunication node, such as telecommunication node 130. In an embodiment, DTCH management program 200 is associated with the SDAP sub-layer and/or the PDCP sub-layer and interfaces telecommunication support 112 to establishes contact between UE 110 and telecommunication node 130. In addition, DTCH program 200 transmits information relate to data to uplink, such as whether a logical channel transfers compressed data or data that was excluded from compression, a quantity of data to uplink (affects quantity DTCHs created), etc., to telecommunication node 130.

Responsive to DTCH program 200 establishing wireless communications 120 between UE 110 and telecommunication node 130, DTCH program 200 receives an ID corresponding to each DTCH created by telecommunication node 130 for UE 110. DTCH management program 200 also maintains one or more tables within mapped tables 116 that interrelate app IDs, DTCH IDs, and respective status flags related to data compression.

In various embodiments, DTCH program 200 interfaces with PDCP management program 300 to prepare and uplink data based on a compression status flag respectively associated with the app, data, and/or datatype/file format included within mapped tables 116. In a further embodiment, DTCH program 200 can request that telecommunication node 130 create a plurality of DTCHs (i.e., logical channels) links between UE 110 and telecommunication node 130 to process packets of corresponding to different data and/or requesting apps at differing "quality of service" (QoS).

PDCP management program 300 selectively excludes data (i.e., data packets) within the PDCP sub-layer from the PDCP payload compression function prior to uplink to a 5G telecommunication system based on information included within mapped tables 116, such as compression status flags respectively associated with an app of apps 113, data generated by an app, and/or data utilized by an app. PDCP management program 300 can also utilize and/or execute functions and services included within the PDCP sub-layer, such as transfers of data (user plane or control plane), maintenance of PDCP instance PIDs, header compression and decompression using the ROHC protocol, ciphering and deciphering, integrity protection, integrity verification, etc.

In an embodiment, PDCP management program 300 can also monitor the compression ratio of data packets by of the compression mechanism native to the PDCP sub-layer and update a table or list within mapped tables 116 for a given data type/file format or an app that generated data. In some embodiments, PDCP management program 300 can reroute the data between logical channels assigned to an app based on previously determined compression ratio values included within another table or list within mapped tables 116 and other factors, such as the battery life remaining within UE 110 and/or a latency dictate. In a further embodiment, PDCP management program 300 can independently process data packets of the plurality of data packets that comprise the data to uplink based on the compression status flag assigned to each logical channels and a segmentation analysis of the data to uplink.

In an embodiment, wireless communications 120 includes wireless signals 121 produced by UE 110, element 122 representing control channels between UE 110 and telecommunication node 130, and element 123 representing dedicated traffic channels the uplink data from UE 110 to telecommunication node 130. In various embodiments, wireless communications 120 are based on a 5G NR technology architecture.

Wireless signals 121 represents a plurality of communications transmitted from UE 110 to telecommunication node 130, such as requests to establish a wireless link between UE 110 and telecommunication node 130, requests to establish control and dedicated traffic channels for utilized to uplink data (i.e., element 123), etc. In addition, wireless signs also represent the receipt of wireless communications from telecommunication node 130, such as element 122.

In and embodiment, element 122 (double headed arrow) represents a set of one or more control channels associated with establishing communications and conveying messages between UE 110 and telecommunication node 130, such as handshakes, a DTCH_CONNECT request, control instructions related to compression status flags, DTCH_CREATE requests, DTCH_ID information generated within telecommunication node 130, payload receipt acknowledge messages, transfers messages, etc.

Examples of control channels within element 122 include a broadcast control channel (BCCH), a downlink channel for broadcasting system control information; a paging control channel (PCCH), a downlink channel that carries paging messages; a common control channel (CCCH), channel for transmitting control information between UE 100 and telecommunication node 130; a dedicated control channel (DCCH), a point-to-point bi-directional channel that transmits dedicated control information between UE 110 and telecommunication node 130.

In an embodiment, element 123 (group of four dashed lines) represents a set of created dedicated traffic channels (DTCHs) utilized to uplink data packets from UE 110 to telecommunication node 130. In various embodiments, the DTCHs represented by element 123 are identified with a corresponding DTCH ID assigned by telecommunication node 130, and further associated with a status flag corresponding to each DTCH ID that indicates whether a DTCH uplinks compressed data to telecommunication node 130 or a DTCH that uplinks data to telecommunication node 130 excluded from compression.

In an embodiment, telecommunication node 130 is eNodeB transceiver station (e.g., base station) of a 5G telecommunication network associated with network link 135 and network 140. In an embodiment, telecommunication node 130 includes other hardware, computing equipment, and software (not shown) that enables 5G NR wireless communications with a plurality of instances of UE 110, and provide various functions and services. Instances of telecommunication node 130 may include components, as depicted and described in further detail with respect to FIG. 4, in accordance with embodiments of the present invention.

Examples of functions and services provided by telecommunication node 130 include but are not limited to as radio bearer control, radio admission control, connection mobility control, dynamic allocation of resources to UEs for both uplink and downlink (e.g., scheduling), IP header compression/decompression, packet and/or data encryption/decryption, integrity protection of data, connection setup and release (e.g., quantity of DTCHs to create, DTCH ID assignments, etc.), scheduling and transmission of paging messages and/or system broadcast information, metadata class/function table maintenance, support of network slicing, QoS flow management and mapping to data radio bearers, radio access network sharing, etc. For example, telecommunication node 130 includes a metadata table that identifies the DTCH IDs that correspond to traffic channels that received compressed data payloads and traffic channels that include data payloads that were excluded from data compression.

Network link 135 is representative of one or more communications interconnections between telecommunication node 130 and network 140. Network link 135 may operate via wired, wireless, or optical connections and can be any combination of connections and protocols (described in further detail with respect to network 140).

Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between telecommunication node 130 and other networks and endpoints (not shown), in accordance with embodiments of the present invention. In various embodiments, at least a portion of network 140 operates locally via wired, wireless, or optical connections and can be any combination of connections and protocols (e.g., personal area network (PAN), Bluetooth®, near field communication (NFC), laser, infrared, ultrasonic, etc.).

In various embodiments, telecommunication node 130, network link 135, and network 140 represent a portion of a 5G telecommunication network that receives, and forwards data uplinked from UE 110 to another network and/or one or more endpoints (not shown). Examples of other networks and endpoints that include but are not limited to the Internet; an intranet of an enterprise; a wirelessly accessible device of another user; such as a smart phone, a tablet computer, a wearable device (e.g., smart glasses, a wireless headset, etc.), a smart TV, etc.

Figure 2:
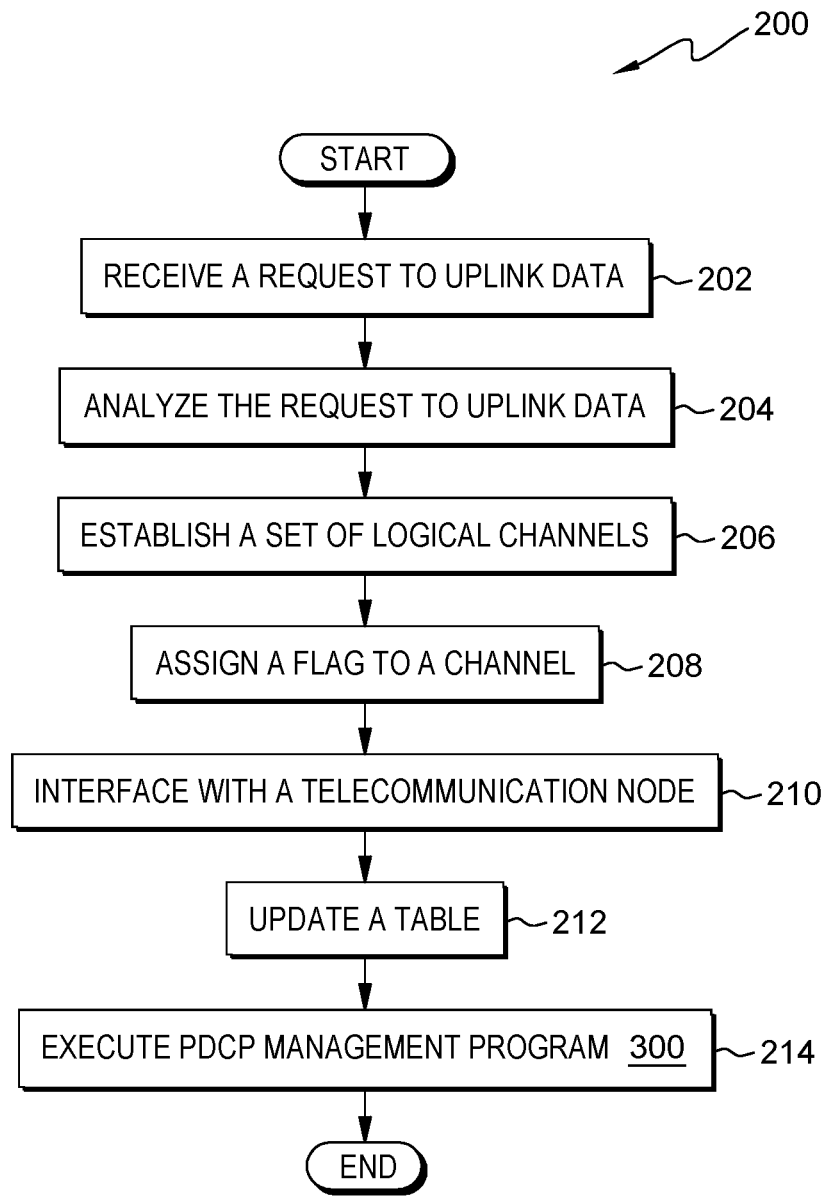
FIG. 2 a flowchart of steps of a dedicated traffic channel management program, in accordance with an embodiment of the present invention.

FIG. 2 is a flowchart depicting operational steps for dedicated traffic channel (DTCH) management program 200, a program that establishes a set of wireless communication channels to uplink data from a mobile device of a user to a 5G telecommunication node, in accordance with embodiments of the present invention. In various embodiments, DTCH management program 200 calls (i.e., executes) an instance of packet data convergence protocol (PDCP) management program 300 to selectively compress and uplink data to the 5G telecommunication node for each app that request to uplink data. In some embodiments, DTCH management program 200 is included as a new function or service within the SDAP sub-layer or is associated with telecommunication support 112, such as via a firmware update to the DTCH controller (not shown) of UE 110.

In step 202, DTCH management program 200 receives a request to uplink data. In one embodiment, DTCH management program 200 receives a request to uplink data to a 5G telecommunication network from a user of UE 110 via an app of apps 113. In another embodiment, DTCH management program 200 receives an automated request to uplink data to a 5G telecommunication network from another app of apps 113, such as a calendar app. For example, DTCH program 200 may detect that a DTCH_CONNECT request arrives at the DTCH controller (not shown) of UE 110. In some embodiments, DTCH management program 200 processes a plurality of requests to uplink data from two or more apps of apps 113. DTCH management program 200 may process data uplink requests from concurrently executing app and/or apps that execute during the same session (i.e., link) between UE 110 and telecommunication node 130.

In step 204, DTCH management program 200 analyzes the request to uplink data. In addition, DTCH management program 200 analyzes the request to uplink data to determine other information related to the request to uplink data, such as a PID corresponding to an app or app instance, quantity of data to upload, a QoS dictated associated with the request, a quantity of logical channels assigned to process the data to uplink, etc. In one embodiment, DTCH management program 200 analyzes the request to uplink data by enquiring the app that created the request to determine whether the data associated with the uplink request is excluded from compression. In another embodiment, DTCH management program 200 analyzes the request to uplink data by an app based on information included among mapped tables 116, such as identifying a compression status flag associated with an app and/or a give data type/file format.

In a further embodiment, DTCH management program 200 analyzes the request to uplink data and determines that the data generated by an app or selected from among the plurality of data within data 114 includes a combination of data or a plurality of data packets that includes a first group of data or data packets that are compressible and a second group of data or data packets excluded from data compression prior to uplink. DTCH management program 200 may also determine that some data related to the request is flagged as potentially compressible or of a reduced compression ratio.

In step 206, DTCH management program 200 establishes a set of logical channels. In an embodiment, DTCH management program 200 establishes a set of logical channels internal to UE 110, based on the request to uplink data, such as a quantity of dedicated traffic channels utilized to transfer (e.g., handle or process) the data associated with the request. DTCH management program 200 assigns (e.g., allocates) different sets of logical channels to each app of apps 113 that requests to uplink data to a 5G telecommunication network via telecommunication node 130. In some embodiments, DTCH management program 200 also associates a QoS to a set of logical channels.

In step 208, DTCH management program 200 assigns a flag to a channel. DTCH management program 200 assigns a compression status flag to each channel of the set of logical channels designating whether a logical channel processes (e.g., handles) data to compress prior to uplink or that the logical channel processes data excluded from compression prior to uplink. In one embodiment, DTCH management program 200 assign the same compression status flag to each logical channel of set of logical channels assigned to an app. In another embodiment, DTCH management program 200 assigns differing compression status flags among the set of logical channels assigned to an app based on the quantity of data to compress prior to uplink and the quantity of data excluded from compression prior to uplink.

In step 210, DTCH management program 200 interfaces with a telecommunication node. In an embodiment, DTCH management program 200 interfaces (e.g., establishes wireless communications 120) with telecommunication node 130 via wireless signals 121. For example, DTCH management program 200 utilizes an aspect of telecommunications support 112, such as a channel manager (not shown) that performs a radio resource allocation and messaging telecommunications node 130 by signaling DTCH_CONNECT followed by a DTCH creation tasks (i.e., DTCH_CREATE). DTCH management program 200 exchanges parameters and other information respectively associated with a set logical channels with telecommunication node 130. In response, DTCH management program 200 receives a set of DTCH IDs corresponding to the logical channels assigned to each app uplinking data to telecommunication node 130.

In step 212, DTCH management program 200 updates a table. In an embodiment, DTCH management program 200 updates one or more tables and lists based on information related to a request to uplink data and information received from telecommunication node 130, such as a PID corresponding to an app or an app instance, a compression status assigned to a DTCH ID, one or more data compression status flags associated with data generated by an app for uplink and/or selected by an app for uplink to a 5G telecommunication network; and/or information associated with the plurality of data within data 114.

In step 214, DTCH management program 200 executes PDCP management program 300. In addition, DTCH management program 200 pushes one or more updated tables of mapped tables 116 to a PDCP instance manager (not shown) that assigns a process ID (PID) to a corresponding PDCP instance and a logical channel or a set of logical channels. In an embodiment, DTCH management program 200 executes PDCP management program 300 to selectively compress and uplink data to telecommunication node 130. In some embodiments, DTCH management program 200 executes an instance of PDCP management program 300 for each app that requests to upload data during a given period of time or link between UE 110 and telecommunication node 130.

Figure 3:
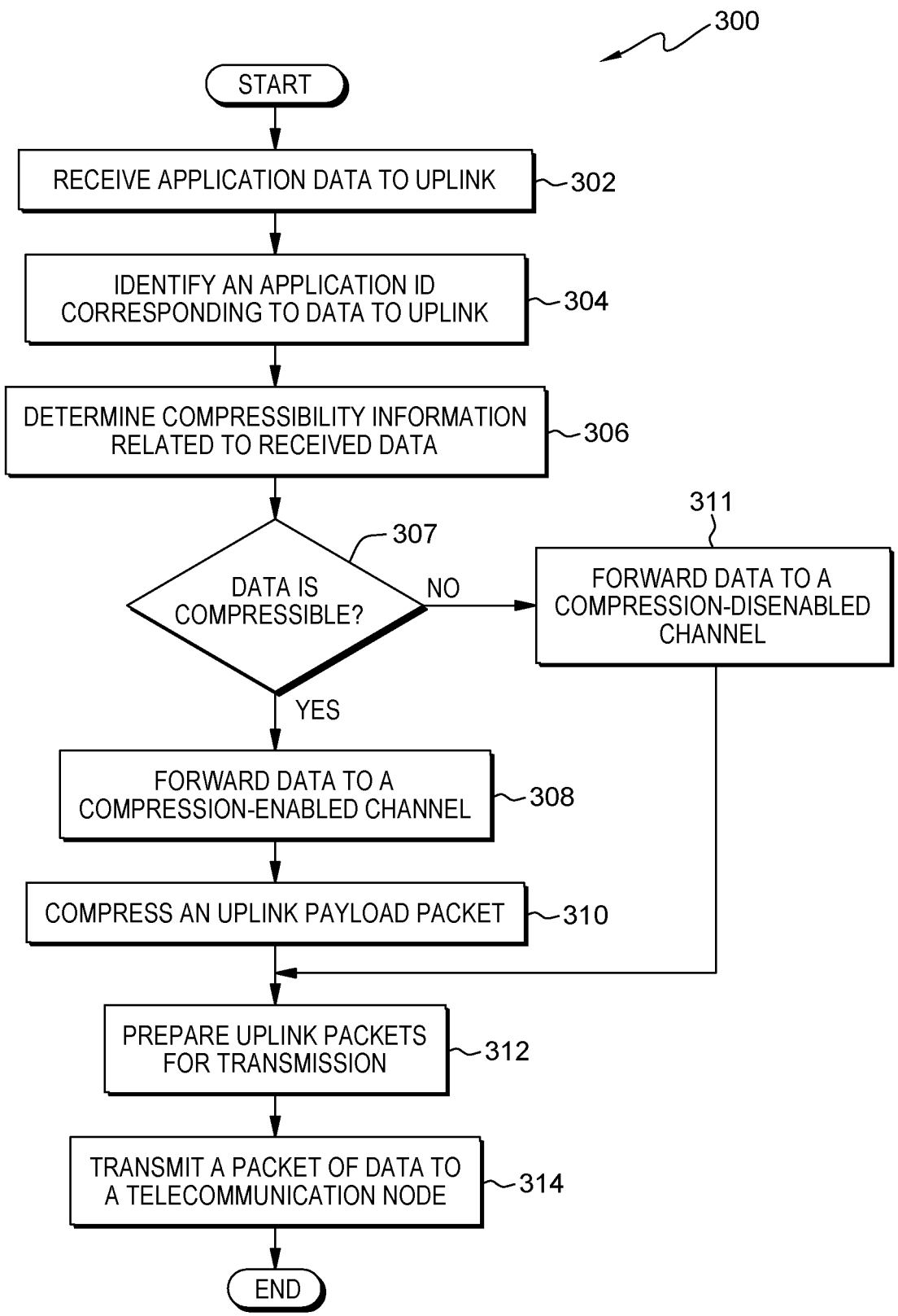
FIG. 3 depicts a flowchart of steps of a packet data convergence protocol management program, in accordance with an embodiment of the present invention.

FIG. 3 is a flowchart depicting operational steps for PDCP management program 300, a program that selectively excludes data and/or data packets from the PDCP payload compression function prior to uplink to a 5G telecommunication node, in accordance with embodiments of the present invention. In various embodiments, multiple instances of PDCP management program 300 can execute concurrently to process data for uplink from different apps or instances of one or more apps. In some embodiments, PDCP management program 300 is included as a new function or service within the PDCP sub-layer or is added to UE 110 via a firmware or OS update that can disable the PDCP payload compression function for one or more child instances of PDCP.

In step 302, PDCP management program 300 receives application data to uplink. In an embodiment, PDCP management program 300 receives data to uplink (i.e., transmission) to a 5G telecommunication system, such as node 130 and network 140 to forward another network and/or one or more endpoints based on information related to a request to uplink data processed by DTCH management program 200. In one scenario, PDCP management program 300 receives data generated by an app of apps 113 to uplink. In another scenario, PDCP management program 300 receives data selected by an app of apps 113 to uplink from among the plurality of data within data 114.

In step 304, PDCP management program 300 identifies an application ID corresponding to data to data to uplink. In an embodiment, PDCP management program 300 identifies an application (app) ID corresponding to data to uplink based on information included within one or more updated mapped tables pushed to PDCP management program 300 by DTCH management program 200. In various embodiments, PDCP management program 300 also determines the one or more DTCH IDs that are assigned to the app requesting to uplink data to a 5G telecommunication system.

In step 306, PDCP management program 300 determines compressibility information related to received data. PDCP management program 300 may segment the data for analysis and/or transfer among logical channels. In one embodiment, PDCP management program 300 determines compressibility information related to the data received from an app for uplink based on information corresponding to one or more logical channels that are assign to the app, such a compression status flag respectively associated with a set of logical channels. In another embodiment, PDCP management program 300 determines compressibility information related to received data, such as an PID correspond to the app associated with a request to uplink data to a 5G telecommunication system and/or metadata information included within data 114 associate with the data received from an app to uplink to the 5G telecommunications system.

In some embodiments, PDCP management program 300 determines compressibility information related to data received from an app to uplink based on other information within included within data 114 and/or mapped tables 116. In one scenario, PDCP management program 300 identifies a non-binary compression status flag (e.g., data is potentially compressible) based on information and/or metadata included within data 114. In another scenario, PDCP management program 300 determines that the data received from an app is excluded from the PDCP payload compression function based on a data type/file format corresponding to the received data. In some scenarios, PDCP management program 300 determines that the data received from an app includes some data packets that are excluded from payload compression and other data packets that can be compressed. In a further embodiment, PDCP management program 300 determines whether the data receive from an app is or is not subject to PDCP payload compression based on other factors, such as previously determined compression ratio values associated with a given data type/file format and/or an app.

In decision step 307, PDCP management program 300 determines whether data is compressible. In one embodiment, PDCP management program 300 determines that the data (e.g., data packet payload) received from an app to uplink is compressible based on a corresponding compression status flag or the data is assigned to a logical channel designated for processing compressible data. In another embodiment, PDCP management program 300 determines that the received data associated with an app uplink request is not compressible (i.e., excluded from data compression) based on a corresponding compression status flag or the data is assigned to a logical channel designated for processing data excluded from compression. (e.g., based on the data format and/or the application that generated the data).

In a further embodiment, PDCP management program 300 determines that a stream of data to uplink from an application includes of plurality (e.g., combinations) of data packets of differing characteristics, such image data, document/content data, voice data, etc. In response, PDCP management program 300 can dynamically (i.e., on-the-fly) route the packets of the stream of data among compression-enabled logical channels and logical channels excluded from compression based on the flag assigned to one or more packets of data. PDCP management program 300 can also adjust the routing of data packets or data segments among logical channels based on other factors, such as reducing overall latency and power consumption by excluding all packets of the received data from data compression or compressing data to reduce the cost to the user of UE 110 associated with transmitting the data via a 5G telecommunication system.

Responsive to determining that data is compressible (Yes branch, decision step 307), PDCP management program 300 forwards the data to a compression-enabled channel (step 308).

In step 308, PDCP management program 300 forwards the data to a compression-enabled channel. In one embodiment, PDCP management program 300 forwards (i.e., transfers) the data to the compression-enabled logical channel assigned to the app that requests to uplink the data to a 5G telecommunication system. In another embodiment, PDCP management program 300 distributes the data among one or more compression-enabled logical channels assigned to the app that requests to uplink the data to a 5G telecommunication system. In some embodiments, PDCP management program 300 forwards the dynamically routed data packets of the data to uplink among the one or more compression-enabled logical channels assigned to the app based on compressibility a compression status flag assigned to a data packet.

In step 310, PDCP management program 300 compresses an uplink payload data packet. In an embodiment, PDCP management program 300 permits the PDCP payload compression function to compress an uplink payload data packet received via a compression-enabled logical channel. In a further embodiment, PDCP management program 300 also monitors the effect of the PDCP payload compression function on the data and determines a compression ratio value. Subsequently, PDCP management program 300 updates mapped tables with the determined compression ratio value respectively associated with an app and/or a data type/file format.

Referring to decision step 307, responsive to determining that data is not compressible (No branch, decision step 307), PDCP management program 300 forwards the data to a compression-disenabled channel (step 311). In another embodiment, responsive to determining that some data packets of the data for uplink are not compressible, PDCP management program 300 forwards the data packets that are not compressible or excluded from compression to one or more compression-disenabled logical channels (step 311).

In step 311, PDCP management program 300 forwards the data to a compression-disenabled channel. In one embodiment, PDCP management program 300 forwards (i.e., transfers) the data, flagged to exclude from data compression, to a compression-disenabled logical channel assigned to the app requesting to uplink the data to a 5G telecommunication network. In another embodiments, PDCP management program 300 distributes the data, flagged to exclude from data compression, among one or more compression-disenabled logical channels assigned to the app that requests to uplink the data to a 5G telecommunication system. In some embodiments, PDCP management program 300 forwards the dynamically routed data packets of the data, flagged to exclude from data compression, among the one or more compression-disabled logical channels assigned to the app based on compressibility a compression status flag assigned to a data packet.

In various embodiments, responsive to forwarding (i.e., transferring) data to one or more compression-disabled logical channels, PDCP management program 300 also bypasses or disables the PDCP payload compression function of a child instance of PDCP from affecting the data transferred via the one or more compression-disabled logical channels assigned to the app.

In step 312, PDCP management program 300 prepares uplink packets for transmission. In an embodiment, PDCP management program 300 prepares data packets for uplink by adding compression status flag to the header and executing one or more services and/or functions of the PDCP sub-layer, such as packet alignment, applying uplink packed header information, header compression (e.g., utilizing the RoHC protocol), ciphering and other data convergence activities. In addition, PDCP management program 300 further associated the uplink data packets with the one or more DTCH IDs assigned to the app associated with the data.

In step 314, PDCP management program 300 transmits a packet of data to a telecommunication node. In an embodiment, PDCP management program 300 utilizes one or more functions and/or services of the RLC sub-layer to interface with telecommunication support 112 to uplink data packets to telecommunication node 130 via the set of DTCH IDs respectively associated with an app ID (represented by element 123) and further based on respectively data compression status flags associated with the DTCH IDs within mapped tables 116. In addition, PDCP management program 300 indicates to telecommunication node 130 that data uplink is complete by executing a DTCH_DISCONNECT operation via a control channel represented by element 122 and updates mapped tables 116 with the logical channel resource release. In response, telecommunication node 130 performs various resource management tasks based on the information associated with the DTCH_DISCONNECT operation executed by UE 110.

Figure 4:
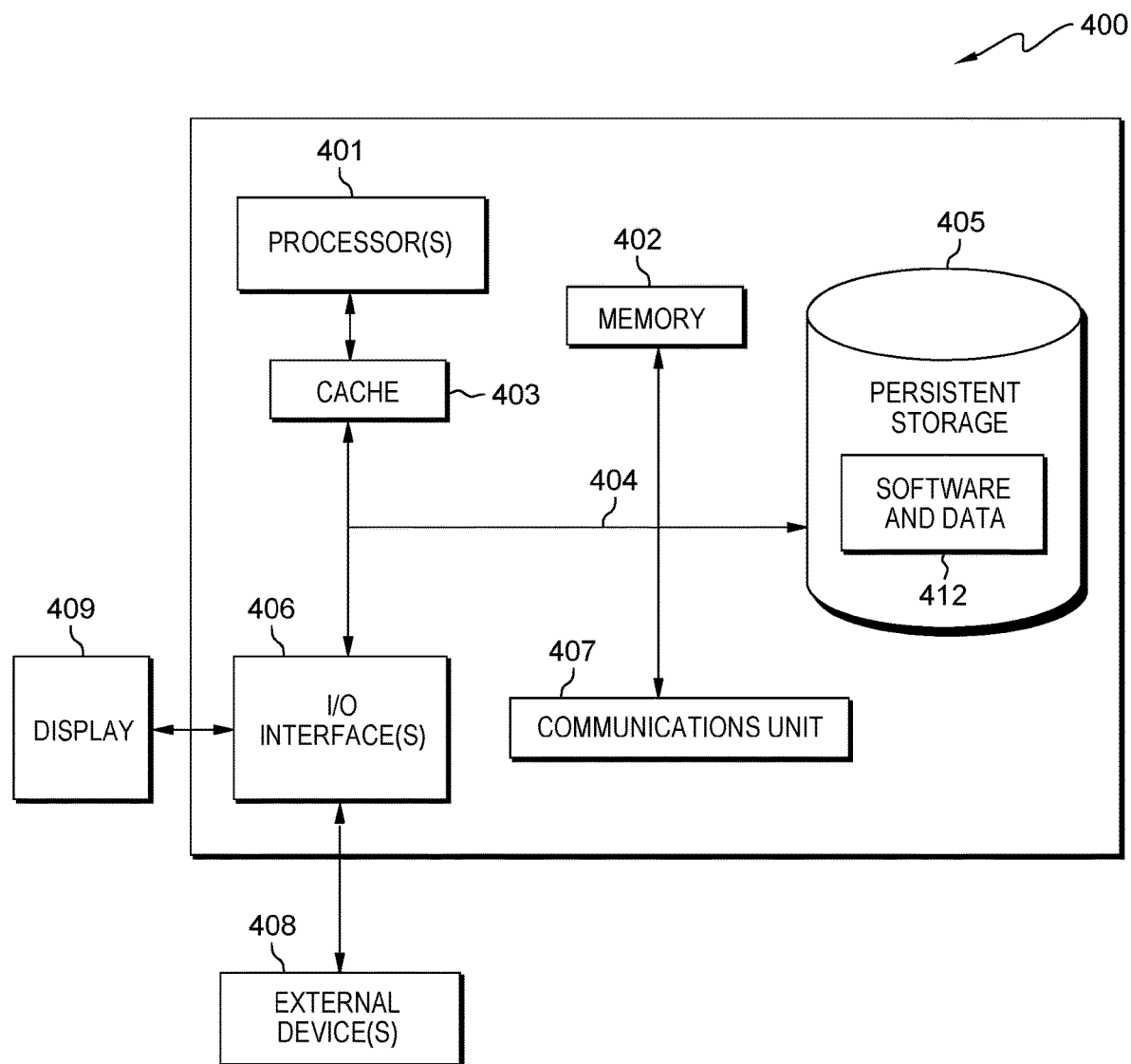
FIG. 4 is a block diagram of components of a computer, in accordance with an embodiment of the present invention.

FIG. 4 depicts computer system 400, which is representative of UE 110 and a portion (not shown) of telecommunication node 130. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406.

Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses, such as a peripheral component interconnects (PCI) bus, or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to UE 110, software and data 412 includes telecommunication support 112, apps 113, data 114, mapped tables 116, DTCH management program 200, PDCP management program 300, and other programs and data (not shown). With respect to telecommunications node 130, software and data 412 includes 5G NR software, firmware, metadata tables, and other programs and data (not shown).

Communications unit 407, in these examples, provides for communications with other data processing systems or devices, including resources of UE 110 and various portions of telecommunication node 130. In these examples, communications unit 407 includes one or more network interface cards. Communications unit 407 may provide communications, through the use of either or both physical and wireless communications links. In an embodiment, communications unit 407 generates wireless communications 120. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
analyzing, by one or more computer processors, a request by an application, executing within a device, to wirelessly uplink data to a telecommunication node;
establishing, by one or more computer processors, a set of logical channels assigned to the application;
transferring, by one or more computer processors, the data among one or more logical channels, of the set of logical channels, based on a status flag related to data compression corresponding to the data;
determining, by one or more computer processors, that the data is transferred via a compression-disabled logical channel, of the set of logical channels;
responsive to determining that the data is transferred via the compression-disabled logical channel, bypassing, by one or more computer processors, a data compression function prior to preparing the data for uplink; and uplinking, by one or more computer processors, the data to the telecommunication node.

2. The computer-implemented method of claim 1, wherein the device and the telecommunication node each support fifth-generation new radio (5G NR) architecture functions and services related to preparing data for transmission and establishing wireless communications.

3. The computer-implemented method of claim 1, wherein analyzing the request to wirelessly uplink the data to the telecommunication node further comprises:
    identifying, by one or more computer processors, a process ID (PID) corresponding to the application requesting to uplink data to the telecommunication node;
    determining, by one or more computer processors, compressibility information related to the data associated with the request; and
    determining, by one or more computer processors, a quantity of logical channels utilized to process the data for uplink.

4. The computer-implemented method of claim 1, wherein establishing the set of logical channels assigned to the application further comprises:
    transmitting, by one or more computer processors, a message to a 5G telecommunication node to create a set of one or more dedicated traffic channels (DTCHs) based on the request to uplink the data to the 5G telecommunication node, wherein the message further includes:
        a process ID (PID) corresponding to the application;
        a quantity of DTCHs to assign to the device; and
        a respective status flag related to data compression corresponding to each logical channel that transfers the data of the application for uplink; and
    responsive to transmitting the message to the 5G telecommunication node, receiving, by one or more computer processors, from the 5G telecommunication node, a DTCH ID corresponding to each of the one or more DTCHs assigned to the device, wherein each DTCH ID is mapped, within a table, to the PID corresponding the application and further to the each logical channel that transfers the data for the application.

5. The computer-implemented method of claim 1, wherein the status flag related to data compression is selected from the group consisting of: a compression-enabled status flag and a compression-disabled status flag.

6. The computer-implemented method of claim 2, wherein 5G data compression is performed by a payload compression function included within a packet data convergence protocol (PDCP) sub-layer included within the 5G NR architecture included in the device.

7. The computer-implemented method of claim 4, wherein the data is uplinked to the 5G telecommunication node via one or more dedicated traffic channels (DTCHs) assigned to the device by the 5G telecommunication node.

8. The computer-implemented method of claim 1, wherein preparing the data for uplink further comprises:
    segmenting, by one or more computer processors, the data into a plurality of data packets; and
    applying, by one or more computer processors, header information to each data packet of the plurality of data packets, wherein the header information further includes the status flag related to data compression corresponding to the data.

9. A computer program product comprising:
    one or more computer readable storage device, and program instructions collectively stored on the one or more computer readable storage device, the program instructions comprising:
        program instructions to analyze a request by an application, executing within a device, to wirelessly uplink data to a telecommunication node;
        program instructions to establish a set of logical channels assigned to the application;
        program instructions to transfer the data among one or more logical channels, of the set of logical channels, based on a status flag related to data compression corresponding to the data;
        program instructions to determine that the data is transferred via a compression-disabled logical channel, of the set of logical channels;
        responsive to determining that the data is transferred via the compression-disabled logical channel, program instructions to bypass a data compression function prior to preparing the data for uplink; and
        program instructions to uplink the data to the telecommunication node.

10. The computer program product of claim 9, wherein the device and the telecommunication node each support fifth-generation new radio (5G NR) architecture functions and services related to preparing data for transmission and establishing wireless communications.

11. The computer program product of claim 9, wherein program instructions to analyze the request to wirelessly uplink the data to the telecommunication node further comprises:
    program instructions to identify a process ID (PID) corresponding to the application requesting to uplink data to the telecommunication node;
    program instructions to determine compressibility information related to the data associated with the request; and
    program instructions to determine a quantity of logical channels utilized to process the data for uplink.

12. The computer program product of claim 9, wherein program instructions to establish the set of logical channels assigned to the application further comprise:
    program instructions to transmit a message to a 5G telecommunication node to create a set of one or more dedicated traffic channels (DTCHs) based on the request to uplink the data to the 5G telecommunication node, wherein the message further includes:
        a process ID (PID) corresponding to the application;
        a quantity of DTCHs to assign to the device; and
        a respective status flag related to data compression corresponding to each logical channel that transfers the data of the application for uplink; and
    responsive to transmitting the message to the 5G telecommunication node, program instructions to receive, from the 5G telecommunication node, a DTCH ID corresponding to each of the one or more DTCHs assigned to the device, wherein each DTCH ID is mapped, within a table, to the PID corresponding the application and further to the each logical channel that transfers the data for the application.

13. The computer program product of claim 9, wherein the status flag related to data compression is selected from the group consisting of a compression-enabled and compression-disabled.

14. The computer program product of claim 10, wherein 5G data compression is performed by a payload compression function included within a packet data convergence protocol (PDCP) sub-layer included within the 5G NR architecture included in the device.

15. The computer program product of claim 12, wherein the data is uplinked to the 5G telecommunication node via one or more dedicated traffic channels (DTCHs) assigned to the device by the 5G telecommunication node.

16. A computer system comprising:
one or more computer processors;
one or more computer readable storage media; and
program instructions stored on the computer readable storage media for execution by at least one of the one or more computer processors, the program instructions comprising:
program instructions to analyze a request by an application, executing within a device, to wirelessly uplink data to a telecommunication node;
program instructions to establish a set of logical channels assigned to the application;
program instructions to transfer the data among one or more logical channels, of the set of logical channels, based on a status flag related to data compression corresponding to the data;
program instructions to determine that the data is transferred via a compression-disabled logical channel, of the set of logical channels;
responsive to determining that the data is transferred via the compression-disabled logical channel, program instructions to bypass a data compression function prior to preparing the data for uplink; and
program instructions to uplink the data to the telecommunication node.

17. The computer system of claim 16, wherein the device and the telecommunication node each support fifth-generation new radio (5G NR) architecture functions and services related to preparing data for transmission and establishing wireless communications.

18. The computer system of claim 16, wherein program instruction to analyze the request to wirelessly uplink data to the 5G telecommunication node further comprise:
program instructions to identify a PID corresponding to the application requesting to uplink data to the 5G telecommunication node;
program instructions to determine compressibility information related to the data associated with the request; and
program instructions to determine a quantity of logical channels utilized to process the data for uplink.

19. The computer system of claim 16, wherein program instructions to establish the set of logical channels assigned to the application further comprise:
program instructions to transmit a message to a 5G telecommunication node to create a set of one or more dedicated traffic channels (DTCHs) based on the request to uplink the data to the 5G telecommunication node, wherein the message further includes:
a process ID (PID) corresponding to the application;
a quantity of DTCHs to assign to the device; and
a respective status flag related to data compression corresponding to each logical channel that transfers the data of the application for uplink; and
responsive to transmitting the message to the 5G telecommunication node, program instructions to receive, from the 5G telecommunication node, a DTCH ID corresponding to each of the one or more DTCHs assigned to the device, wherein each DTCH ID is mapped, within a table, to the PID corresponding the application and further to the each logical channel that transfers the data for the application.

20. The computer system of claim 17, wherein 5G data compression is performed by a payload compression function included within a packet data convergence protocol (PDCP) sub-layer included within the 5G NR architecture included in the device.

* * * * *